3,508,613
CHEMICAL DISAGGREGATION OF ROCK CONTAINING CLAY MINERALS
Ray V. Huff and Larman J. Heath, Bartlesville, Okla., assignors to the United States of America as represented by the Secretary of the Interior
No Drawing. Filed Nov. 7, 1968, Ser. No. 774,174
Int. Cl. B02c *19/00;* E21b *43/26*
U.S. Cl. 166—307        15 Claims

ABSTRACT OF THE DISCLOSURE

Rock containing clay minerals which do not swell in water is chemically fractured and disaggregated by treatment with a compound, such as hydrazine, urea, and the alkali metal salts of lower carboxylic acids, which forms an intercalation product with the clay minerals. The rock may be treated in situ.

---

Disaggregation of rock finds use in a number of areas including mining, ore dressing and hydrocarbon production. In specialized situations, chemical disaggregation of rock is advantageous as compared to mechanical disaggregation. Chemical disaggregation is normally accomplished by dissolving the cement binding individual particles making up the rock. Probably the most common example of chemical disaggregation is in the acid leaching of a siliceous sandstone bound together with a carbonate cement.

Complete or partial chemical disaggregation of hydrocarbon-bearing reservoir rock is useful primarily in increasing the deliverability of wells, particularly of gas-producing and gas-storage wells. Disaggregation of the host rock tends to enlarge the wellbore and may create, enlarge or extend horizontal and vertical formation fractures. Physical enlargement of the wellbore within practical limits has a moderate effect on increasing deliverability. For example, if a wellbore radius were increased from ⅓ ft. to 2 ft., assuming a drainage radius of 600 feet, then deliverability would theoretically increase by about 31%. However, permeability of a formation in proximity to a bore hole is often severely de- due to the skin effect created by contamination of the formation by drilling fluids. In the above example, if permeability of the formation were decreased by 75% to a radial distance of 2 feet due to the skin effect, then the same wellbore enlargement would increase deliverability by about 125%. In these circumstances, wellbore enlargement would be highly beneficial. Any formation fractures produced or extended by the treatment would of course also increase deliverability.

It is also known that a number of compounds associate with kaolinitic clays to form intercalation products. Molecules of these compounds enter between individual kaolinite unit cell layers to form a complex which distends the lattice structure of the clay mineral. This reaction finds use in the treatment of clays to enhance their plastic and thixotropic characteristics as is shown for example in U.S. Patent 3,309,211.

SUMMARY OF THE INVENTION

It has now been found that rocks which contain intercalation compound-forming clay minerals such as kaolinite intimately dispersed throughout the rock as a cementing or indurating material may be disaggregated or fractured by treatment with an intercalation product-forming compound. It is believed that the swelling produced by the formation of an intercalation compound or complex creates sufficient internal stress within the rock to produce fractures and spalling of the rock components. Rocks which have been found to disaggregate by this process include sandstone, quartzite and altered monozonite.

Hence, it is an object of this invention to cause disaggregation and fracturing of rocks by chemical means.

It is a further object of this invention to react clay minerals dispersed throughout a rock with an intercalation product-forming compound to cause physical expansion of the rock.

A specific object of this invention is to treat hydrocarbon reservoir rock penetrated by a wellbore with a disaggregating and fracture-causing compound in order to increase deliverability of fluids from the formation to the wellbore.

Another specific object of this invention is to treat mineral ores with a disaggregation-causing compound to reduce or eliminate milling operations and to otherwise aid in the mining and processing of minerals.

DETAILED DESCRIPTION OF THE INVENTION

The method of the present invention consists of the treatment of rocks containing particular types of clay with an intercalation-forming compound. An extensive listing of such compounds is found in U.S. Patent 3,309,211. Rock amenable to treatment by the process must have sufficient porosity and permeability to allow the treating compound to penetrate, must contain at least small quantities of intercalation-forming clays and must have the clay content distributed throughout the rock, preferably at or between the contacts of the particles making up the rock. Clays which enter into an intercalation reaction are exemplified by kaolinite, nacrite, dickite, halloysite, chlorites, mixed-lattice minerals, and mixtures of these with other clay minerals.

While all materials capable of forming intercalation compounds or complexes with clays are contemplated for use in the process, aqueous solutions of hydrazine, urea, the alkali metal salts of lower carboxylic acids, particularly potassium acetate and mixtures of these materials have been found to give especially good results. Rocks may be treated simply by immersion in the intercalation-forming compound or the compound may be forced into the rock by hydrostatic pressure. This last method finds particular use in the treatment of rock in situ as in the treatment of reservoir rock to increase the deliverability of fluids to or from a wellbore and in the hydraulic mining of suitable ore bodies. The reaction appears to be completely reversible and the treating compound can be recovered; as for example by water washing.

Clay minerals include a complicated assemblage of hydrous aluminum-silicates. Often the aluminum cation is replaced by other metallic cations and insertional layers of other cations or water molecules or both between unit cells of the clay minerals are common.

Kaolinite is perhaps the simplest clay mineral and is an example of one which forms intercalation compounds. A kaolinite unit cell consists of a silicon-oxygen tetrahedral sheet superimposed on an aluminum-oxygen-hydroxyl octahedral sheet with the direction normal to these sheets being designated the $c$ axis. The unit spacing in the $c$ direction; the distance from the bottom of one unit cell to the bottom of the next adjacent unit cell is reported to be 7.16 A. Unit cells are held together by relatively weak hydrogen bridge bonds between the hydrogen in the hydroxyl layer of the octahedral sheet and the oxygen of the tetrahedral sheet of the adjacent unit cell. While the bonding between unit cells is relatively weak, it is still sufficiently strong to resist sliding of unit cell layers and to preclude any swelling of kaolinite by water or other naturally occurring liquids.

When kaolinite is contacted with an intercalation product-forming compound, for example an aqueous hydrazine solution, hydrazine molecules enter between kaolinite unit cell layers and distend the lattice structure. The intercalation reaction appears to be both chemical and physical.

Neither water nor anhydrous hydrazine will alone expand kaolinite. The fact that together they expand the clay suggests some mechanism other than physical adsorption. Whether the reaction is physical or chemical, it appears to be completely reversible and the intercalation product-forming compound may be recovered by water washing, drying and similar methods.

Formation of the kaolinite-hydrazine intercalation compound or complex results in a distention of the unit cell spacing from 7.16 A. to 10.41 A., corresponding to a volume increase of roughly 50%. Calculations indicate that expansion pressures developed by the intercalation process are probably in the range of 50,000 to 250,000 p.s.i. These pressures are sufficiently high to easily explain the fracturing and disaggregation of rock specimens.

Montmorillonite is another common clay but is one which is usually found in a hydrated form. Effectively then, hydrated montmorillonite can be considered to occur in an intercalated state. The montomrillonite unit cell is composed of two silicon-oxygen tetrahedral sheets sandwiching an aluminum-oxygen-hydroxyl octahedral sheet. The unit cells are separated by water molecules. Sodium montmorillonite for example can absorb up to about 140 layers of water molecules between each unit cell. Montmorillonite is generally responsible for the sensitivity of so-called water sensitive formations. When water is injected into these formations, the clay expands and usually causes a decrease in the effective permeability of the formation. No instances are known however, of montmorillonite expansion resulting either in rock disaggregation or formation fracturing.

Bentonite (a montmorillonite-type clay) will adsorb many layers of water but the swelling pressure decreases rapidly for each succeeding layer. Swelling pressures have been calculated by Van Olphen (Compaction of Clay Sediments in the Range of Molecular Particles Distances, Clays and Clay Minerals, 11th National Conf., Pergamon Press, 1963, pages 178–187) for the first four molecular layers. The values are as follows: first layer, 79,000 p.s.i.; second layer, 37,000 p.s.i.; third layer 18,000 p.s.i.; and fourth layer, 2800 p.s.i. Succeeding layers will show even lower swelling pressures.

Since the swelling pressures of bentonitic clays are on the same order of magnitude as those calculated for kaolinite, it might appear that their behavior in a rock sample or formation should be the same. The extreme differences in observed behavior between the two types of clays may be explained upon consideration of two factors. First, kaolinite naturally occurs in rocks in its non-distended form while montmorillonite-type clays, being in contact with formation fluids, are usually found in a highly hydrated state. Any swelling pressure exerted by additional absorption of water or other compounds would necessarily be slight. Secondly, due to the hydrogen bonding between adjacent kaolinite unit cells, the intercalation process is believed to be a directed pressure parallel to the $c$ axis compared to the almost hydrostatic pressure developed by swelling of montmorillonite which lacks the hydrogen bridge bonds along the $c$ axis.

The concentration of reactive clay necessary in a rock sample to cause fracturing and disaggregation by means of the intercalation reaction depends primarily upon how the clay is distributed within the rock. If the clay is intimately dispersed throughout the rock primarily as a coating on individual particles making up the rock, then smaller clay concentrations will result in fracturing and disaggregation than would be the case if the clay were dispersed in a layer fashion. It has been found that, in the case of kaolinite intercalated with hydrazine, the minimum effective concentration required to cause disaggregation is about 2%. Effective clay concentration is defined as that contributing to the swelling of the rock sample as a result of the intercalation reaction. At an effective concentration of 4%, disaggregation is relatively rapid and complete.

Following is a description by way of example of specific treating methods of the present invention.

EXAMPLE 1

The Berea sandstone reportedly is cemented by calcite and siderite. Although both of these minerals are soluble in hydrochloric acid, a sample leached in the acid did not disaggregate. Another sample of Berea sandstone was immersed in hydrazine hydrate and disaggregation occurred.

A third sample of Berea sandstone was mechanically disaggregated and the fine fraction was subjected to X-ray diffraction analysis. Strong peaks of 3.57 A. and 7.16 A., which are characteristic of kaolinite, were observed. The fine fraction from the hydrazine-disaggregated sample was then subjected to X-ray diffraction analysis. There was almost complete attenuation of the kaolinite peak at 7.16 A. and an intense peak was observed at 10.41 A. This last peak corresponds to the kaolinite-hydrazine complex peak reported in the literature.

A fourth sample of Berea sandstone was immersed in a concentrated aqueous solution of potassium acetate. Disaggregation occurred and the fine fraction was again analyzed by X-ray diffraction. A very intense peak was observed at 14.01 A. which corresponds to that reported in the literature for the potassium acetate-kaolinite complex.

Since disaggregation of the Berea occurred both in hydrazine hydrate and in potassium acetate and since both the characteristic hydrazine-kaolinite and the potassium acetate-kaolinite complexes were detected, it was concluded that disaggregation was caused by kaolinite expansion.

EXAMPLE 2

Screening tests were run on sandstone samples from a number of formations known to be hydrocarbon reservoir rock. A small sample was immersed in an aqueous 64% hydrazine solution (hydrazine hydrate). Partial to complete disaggregation occurred in samples from the following formations: Bandera, Bartlesville, Berea, Bradford, Carizzo, Cottage Grove, Noxie, and Prue. Some samples of the Bradford fractured rather than completely disaggregating.

Samples from the following formations are among those which did not disaggregate in the hydrazine solutions: Bigheart, Big Injun, Clarendon, Clinton, Gordon, Kane, Oriskany, Roubidoux, Torpedo and Venango.

All samples which disaggregated were subjected to X-ray analysis. In every case an attenuation of the kaolinite peak was observed together with an indication of a hydrazine-kaolinite complex being formed.

EXAMPLE 3

Blocks of Noxie sandstone 4 to 6 inches square and 8 to 10 inches long were coated with an epoxy resin. After the plastic coating dried, a 2-inch diameter hole, 4 to 6 inches deep was drilled parallel to the long axis in each of the blocks. Hydrazine hydrate was then injected into the blocks to saturation. After treatment, the hole in one of the sandstone blocks was flushed with a water jet at 75 p.s.i. Significant enlargement of the hole occurred.

EXAMPLE 4

An outcrop of Noxie sandstone was selected for further experimentation. The section selected was massive and appeared homogeneous. The site had an eastward-facing vertical exposure of 8 to 10 feet and provided a nearly level working area approximately 12 by 20 feet. A 3-foot deep well was cored to bottom at a point about 9 feet west of the vertical face. The upper 2 feet of the hole was cased and the casing was cemented with epoxy resin. About 100 square feet of the outcrop surface immediately surrounding the well was coated with epoxy resin so as to prevent flow of injected liquids to the surface.

A total of 165 gallons of hydrazine hydrate was injected over a period of about 7 hours using nitrogen at a pressure of 200 p.s.i. About 5 hours after the start of hydrazine injection an intermittent popping noise was heard. Within the next 2 hours, 4 vertical fractures had developed; all radiating outward from the casing and each separated by about 90°. About 18 hours later, the exposed wellbore was washed vigorously with a water jet. This flushing deepened the well and enlarged the bore from its original 4-inch diameter to about 11 inches.

Rock immediately around the well and out to the vertical face was then excavated to a depth of about 26 inches. All four of the vertical fractures could be observed. Three of the fractures terminated at a depth of 15 inches below the surface while the fourth terminated at a depth of about 24 inches. Closer inspection revealed that the vertical fractures terminated on the plane of a horizontal fracture which was domal shaped in the vicinity of the well but became horizontal a short distance away from the wellbore.

The horizontal fracture appeared to have occurred at the top of the hydrazine-saturated zone. It was postulated that pressure developed by swelling of kaolinite as it reacted with hydrazine created an upward and outward expansive force. This swelling placed the upper rock surface in tension; failure occurred and vertical tension fractures developed.

EXAMPLE 5

A sample of the Bandera sandstone, which is tightly bound with a carbonate cement, was first immersed in hydrochloric acid. Acid treatment did not cause disaggregation. The acid-treated sample was then immersed in hydrazine solution. Disaggregation of the acid-treated sample was much more rapid than was the disaggregation of a similar sample without acid treatment.

EXAMPLE 6

A series of Noxie sandstone samples were saturated with crude oil. One group of saturated specimens was flushed with air; a second group was flushed with air and washed with isopropyl alcohol while the third group was not further treated. All three groups were then immersed in hydrazine hydrate. It was found that the time required for disaggregation increased as the oil content of the specimen increased. Those samples saturated with oil and washed with isopropyl alcohol required about the same time to disaggregate as non-oil-wet samples.

EXAMPLE 7

A kaolinitic clay ore containing from about 35 to 80% clay minerals with the balance being mainly quartz was treated with aqueous hydrazine solutions. The ore disintegrated and was then sized by screening.

The following table presents the results of the sizing analysis:

TABLE

| Retained on sieve No.: | Weight percent original sample |
|---|---|
| 48 | 53.8 |
| 200 | 14.8 |
| 270 | 2.5 |
| 325 | 0.8 |
| 400 | .6 |
| pan | 27.5 |

Analysis of the sized fractions showed that the material retained on the 48 mesh sieve was primarily quartz while the material passing the 400 mesh sieve was essentially pure kaolinite. The intermediate fractions showed varying amounts of quartz and kaolinite. Disaggregation of the clay ore, separation of the clay minerals from gangue and improvement in the clay properties was thus accomplished by the one treatment.

EXAMPLE 8

Samples of two different types of copper ore were immersed in aqueous hydrazine solutions. Host rock for the copper ore was (1) quartzite and (2) altered monzonite. Both host rocks were found to contain kaolinite. Disaggregation of both ores occurred.

EXAMPLE 9

Samples of Noxie sandstone were immersed in a saturated aqueous solution of urea and maintained at a temperature of 65° C. Disaggregation occurred but proceeded at a slower rate than with either hydrazine or potassium acetate.

EXAMPLE 10

The Torpedo sandstone does not disaggregate when immersed in hydrazine solutions. A core sample of Torpedo sandstone was prepared and its volume was carefully measured. Hydrazine hydrate was dropped slowly onto the sample until it was apparently saturated. The volume of the core sample was again carefully measured and swelling of the sample was observed. Assuming that all swelling of the rock sample was caused by distention of the kaolinite unit cell from 7.16 A. to 10.41 A. by the intercalation of hydrazine, it was calculated that the effective kaolinite concentration was approximately 2%.

EXAMPLE 11

A sample of Noxie sandstone was found to contain 11% total kaolinite by analysis. Another sample of the same rock was treated with an aqueous hydrazine solution. Disaggregation was rapid and complete. The disaggregated sample was then subjected to treatment for recovery of the hydrazine. Ninety-eight percent of the original hydrazine was recovered.

These examples are illustrative of the scope and usefulness of the invention. Numerous other uses will be apparent to those skilled in the art.

What is claimed is:

1. A process for the fracturing and disaggregation of a host rock containing clay minerals, said clay minerals characterized by non-swelling behavior when in contact with water and naturally occurring earth fluids, which comprises contacting the rock with a solution of a compound which forms an intercalation product with the clay minerals.

2. The process of claim 1 wherein the host rock is composed of mineral particles cemented or indurated by the clay minerals.

3. The process of claim 2 wherein the clay minerals are chosen from the group consisting of kaolinite, nacrite, dickite, halloysite, and mixtures of these with other clay minerals.

4. The process of claim 3 wherein the effective concentration of clay minerals within the host rock is at least about 2%.

5. The process of claim 4 wherein the intercalation-product-forming material is chosen from the group consisting of solutions of hydrazine, urea and the alkali metal salts of lower carboxylic acids.

6. The process of claim 5 wherein the intercalation-product-forming material is an aqueous solution.

7. The process of claim 6 wherein the host rock is chosen from the group consisting of sandstone, quartzite, monzonite and kaolinitic shales.

8. The process of claim 7 wherein the host rock is contacted in situ with the intercalation-product-forming material.

9. The process of claim 8 wherein the host rock is a hydrocarbon reservoir rock and wherein the intercalation-product-forming material is injected into the reservoir rock through a well communicating with the surface to enlarge the wellbore and to create fractures within the rock.

10. The process of claim 9 wherein the intercalation-product-forming material is a 30 to 80% aqueous solution of hydrazine.

11. The process of claim 9 wherein the host rock also contains acid soluble materials and wherein a mineral acid is injected into the reservoir rock prior to treatment with the intercalation forming material.

12. The process of claim 6 wherein the host rock is contacted by immersion in the intercalation-product-forming material.

13. The process of claim 12 wherein the treated disaggregated host rock is thereafter separated into fractions, said fractions comprising a particulate fraction and a residue.

14. The process of claim 13 wherein said residue contains intercalation product.

15. The process of claim 14 wherein intercalation-product-forming material is recovered from said residue.

References Cited

UNITED STATES PATENTS

| | | | |
|---|---|---|---|
| 823,749 | 6/1906 | Wanner | 299—5 X |
| 2,640,810 | 6/1953 | Cardwell et al. | 166—307 X |
| 3,284,281 | 11/1966 | Thomas | 166—308 X |
| 3,309,211 | 3/1967 | Weiss et al. | 106—72 |
| 3,407,003 | 10/1968 | Durie | 299—4 |

STEPHEN J. NOVOSAD, Primary Examiner

I. A. CALVERT, Assistant Examiner

U.S. Cl. X.R.

166—308; 241—1; 299—5